United States Patent
Zhou et al.

(10) Patent No.: US 9,888,186 B2
(45) Date of Patent: Feb. 6, 2018

(54) IMAGE ACQUISITION METHOD AND IMAGE ACQUISITION APPARATUS

(71) Applicant: Beijing Zhigu Rui Tuo Tech Co., Ltd, Beijing (CN)

(72) Inventors: Hanning Zhou, Beijing (CN); Dayong Ding, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/117,183

(22) PCT Filed: Jan. 15, 2015

(86) PCT No.: PCT/CN2015/070764
§ 371 (c)(1),
(2) Date: Aug. 5, 2016

(87) PCT Pub. No.: WO2015/135394
PCT Pub. Date: Sep. 17, 2015

(65) Prior Publication Data
US 2016/0373637 A1 Dec. 22, 2016

(30) Foreign Application Priority Data
Mar. 13, 2014 (CN) .......................... 2014 1 0093604

(51) Int. Cl.
H04N 5/235 (2006.01)
H04N 5/217 (2011.01)
(Continued)

(52) U.S. Cl.
CPC ......... *H04N 5/2355* (2013.01); *G06K 9/4642* (2013.01); *G06K 9/4671* (2013.01);
(Continued)

(58) Field of Classification Search
CPC ............. H04N 5/23232; H04N 3/1593; H04N 5/2355; H04N 5/355; H04N 5/35536; H04N 5/35545; H04N 5/2353
(Continued)

(56) References Cited

U.S. PATENT DOCUMENTS 8,704,908 B1   4/2014 Aldrich et al.
2006/0077269 A1   4/2006 Kindt et al.
(Continued)

FOREIGN PATENT DOCUMENTS

CN   101904166 A   12/2010
CN   102090068 A   6/2011
(Continued)

OTHER PUBLICATIONS

International Search Report for PCT Application No. PCT/CN2015/070764, dated Apr. 22, 2015, 2 pages.
(Continued)

*Primary Examiner* — Kelly L Jerabek
(74) *Attorney, Agent, or Firm* — Amin, Turocy & Watson, LLP

(57) ABSTRACT

Image processing technologies and acquisition methods and apparatus are provided. A method comprises obtaining at least two images of different image quality of a target scene, and combining, according to data characteristics of the at least two images, the at least two images locally to obtain a target image. In a method and apparatus of the embodiments of the present application, local combination is performed on at least two images of different image quality according to data characteristics of the images, so that the dynamic range and/or signal-to-noise ratio can be improved locally on the basis of presenting image details as fully as possible, that is, the image quality can be improved according to requirements.

27 Claims, 4 Drawing Sheets

S110 — Obtain at least two images of different image quality of a target scene

S120 — Combine, according to data characteristics of the at least two images, the at least two images locally to obtain a target image

(51) Int. Cl.
  *G06K 9/46* (2006.01)
  *G06K 9/52* (2006.01)
  *G06K 9/62* (2006.01)

(52) U.S. Cl.
  CPC ............. *G06K 9/52* (2013.01); *G06K 9/6215* (2013.01); *H04N 5/217* (2013.01); *G06K 2009/4666* (2013.01)

(58) Field of Classification Search
  USPC ................. 348/218.1, 239, 362, 364, 367
  See application file for complete search history.

(56) References Cited

U.S. PATENT DOCUMENTS

| | | | |
|---|---|---|---|
| 2006/0119903 A1 | 6/2006 | Chiba et al. | |
| 2009/0066782 A1 | 3/2009 | Choi et al. | |
| 2009/0225189 A1 | 9/2009 | Morin | |
| 2009/0244350 A1 | 10/2009 | Wada | |
| 2010/0026839 A1* | 2/2010 | Border | G06T 3/4053 348/231.2 |
| 2010/0295962 A1 | 11/2010 | Terauchi | |
| 2012/0092529 A1* | 4/2012 | Choi | H04N 5/23219 348/239 |
| 2013/0027589 A1 | 1/2013 | Johansson | |
| 2013/0083201 A1* | 4/2013 | Takacs | H04N 5/23229 348/169 |
| 2013/0335599 A1* | 12/2013 | Zhang | H04N 5/225 348/239 |
| 2014/0347526 A1* | 11/2014 | Hara | H04N 5/357 348/241 |

FOREIGN PATENT DOCUMENTS

| | | |
|---|---|---|
| CN | 102236890 A | 11/2011 |
| CN | 102497516 A | 6/2012 |
| CN | 102510450 A | 6/2012 |
| CN | 102693538 A | 9/2012 |
| CN | 103096000 A | 5/2013 |
| CN | 103402061 A | 11/2013 |
| CN | 103888679 | 6/2014 |
| CN | 103888689 A | 6/2014 |

OTHER PUBLICATIONS

"Fujifilm announces Super CCD EXR" Sep. 22, 2008, published online at [http://www.dpreview.com/news/2008/9/22/fujifilmEXR], retrieved on Aug. 4, 2016, 8 pages.

Butler, Richard. "Fujifilm Finepix F200 EXR Review" Apr. 30, 2009, published online at [http://www.dpreview.com/reviews/fujifilmf200exr/2], retrieved on Aug. 4, 2016, 8 pages.

International Search Report for PCT Application No. PCT/CN2015/070766, dated Apr. 27, 2015, 2 pages.

Office Action dated Sep. 5, 2017 for U.S. Appl. No. 15/117,184, 46 pages.

* cited by examiner

IMAGE ACQUISITION METHOD AND IMAGE ACQUISITION APPARATUS

RELATED APPLICATION

The present application is a U.S. National Stage filing under 35 U.S.C. § 371 of international patent cooperation treaty (PCT) application No. PCT/CN2015/070764, filed Jan. 15, 2015, and entitled "IMAGE ACQUISITION METHOD AND IMAGE ACQUISITION APPARATUS", which claims the benefit of priority to Chinese Patent Application No. 201410093604.5, filed on Mar. 13, 2014, which applications are hereby incorporated herein by reference in their respective entireties.

TECHNICAL FIELD

The present application relates to the field of image processing technologies, and in particular, to an image acquisition method and an image acquisition apparatus.

BACKGROUND

With the development of the digital age and the advance of computer software and hardware technologies, users have increasingly higher requirements on the quality of digital images. In contrast to analog signals, digitization refers to processing information by digital means. For example, a digital camera (DC) is a camera that converts an optical image into electronic data by using an image sensor. The image sensor is a photosensitive charge-coupled device (CCD) or complementary metal-oxide-semiconductor (CMOS). During image acquisition, light passing through a lens is focused on a CCD or CMOS, the CCD or CMOS converts the light into an electrical signal and stores the electrical signal, then the electrical signal is converted into a digital signal by means of analog-to-digital conversion and stored, and an image can be formed after the digital signal is processed by a computer, a display, a printer, or the like.

After an image is digitized, resolution, dynamic range, signal-to-noise ratio and the like become important indicators for evaluating image quality. The image resolution refers to precision of an image, that is, the number of pixels per inch of the image, and the higher the resolution is, the more precise the image is and the more information can be displayed by an image of a same size. The dynamic range refers to a relative ratio between the brightest part and the darkest part of a scene, and is a technical term that describes mathematically the brightness level range of a given scene. The signal-to-noise ratio reflects image quality, that is, reflects whether an image is clean and free of noise. A large signal-to-noise ratio indicates a clean image picture without noticeable noise interference (manifested as "grain" and "snow"), which is pleasant to look at; a small signal-to-noise ratio indicates that there may be snow all over the picture, which seriously affects the image picture. There are many methods for improving image quality in the prior art, but usually one indicator can only be improved by sacrificing another indicator. For example, the dynamic range is improved by sacrificing the resolution, but as a result, image details are reduced; or the image resolution is improved by sacrificing the signal-to-noise ratio, but too much noise is caused.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

An example, non-limiting objective of the present application is to provide an image acquisition solution.

To these and/or related ends, in a first aspect, an embodiment of the present application provides an image acquisition method. The method comprises:
 obtaining at least two images of different image quality of a target scene; and
 combining, according to data characteristics of the at least two images, the at least two images locally to obtain a target image.

In a second aspect, the present application provides an image acquisition apparatus. The apparatus comprises:
 an image obtaining module, configured to obtain at least two images of different image quality of a target scene; and
 a processing module, configured to combine, according to data characteristics of the at least two images, the at least two images locally to obtain a target image.

In a third aspect of the embodiments of the present application, a computer readable storage device is provided, comprising at least one executable instruction, which, in response to execution, causes a system comprising a processor to perform operations, comprising:
 obtaining at least two images of different image quality of a target scene; and
 combining, according to data characteristics of the at least two images, the at least two images locally to obtain a target image.

In a fourth aspect of the embodiments of the present application, a device for image acquisition is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:
 obtaining at least two images of different image quality of a target scene; and
 combining, according to data characteristics of the at least two images, the at least two images locally to obtain a target image.

In a method and apparatus of example embodiments of the present application, local combination is performed on at least two images of different image quality of a target scene according to data characteristics of the images, so that the dynamic range and/or signal-to-noise ratio can be improved locally on the basis of presenting image details as fully as possible, that is, the image quality can be improved according to requirements.

DETAILED DESCRIPTION

Figure 1:
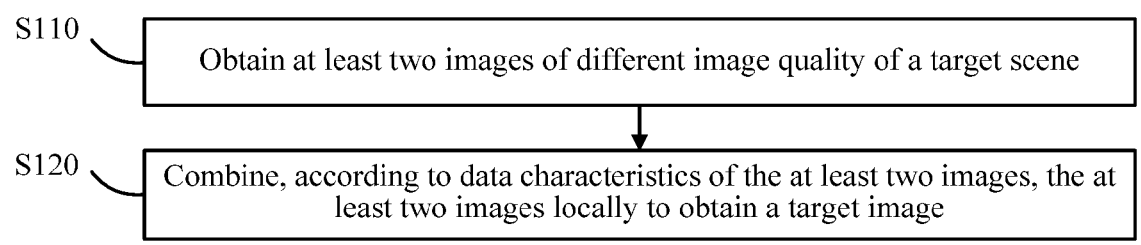
FIG. 1 is an example flowchart of an image acquisition method according to an embodiment of the present application.

Embodiments of the present application are described in further detail below with reference to the accompanying drawings (in which like elements are denoted by like reference numerals) and embodiments. The following embodiments are intended to describe the present application, but not to limit the scope of the present application.

In embodiments of the present application, an image sensor refers to a photosensitive element, comprising a CCD sensor or a CMOS sensor.

As shown in FIG. 1, an image acquisition method of an embodiment of the present application comprises the following steps:

S110. Obtain at least two images of different image quality of a target scene.

In the method of this embodiment of the present application, the different image quality comprises possibilities of: different resolutions and dynamic ranges; different resolutions and signal-to-noise ratios; and different resolutions, dynamic ranges and signal-to-noise ratios. The at least two images of different image quality can be obtained according to different exposure strategies (different durations and numbers of times) and pixel binning technologies. Pixel binning refers to combining information of a group of pixels (for example, two, four or more pixels) into one pixel, so as to reduce picture noise and improve the photosensitivity, and such pixel binning reduces the resolution of the image at the same time.

S120. Combine, according to data characteristics of the at least two images, the at least two images locally to obtain a target image.

The data characteristics of an image may refer to features that represent digital image characteristics, such as grayscale distribution, amount of noise and amount of information of the image. Regions that need a relatively high dynamic range, regions that have a relatively large amount of noise, details that need to be presented, and the like of a target scene can be determined according to the data characteristics of the image. Preferably, in the method of this embodiment of the present application, local pixel binning is performed on the basis of maintaining a relatively large resolution according to the data characteristics of the image, so as to obtain a relatively high dynamic range and/or a relatively high signal-to-noise ratio of the image locally.

In conclusion, in a method of this embodiment of the present application, local combination is performed on at least two images of different image quality of a target scene according to data characteristics of the images, so that the dynamic range and/or signal-to-noise ratio can be improved locally on the basis of presenting image details as fully as possible, that is, the image quality can be improved according to requirements.

In a method of this embodiment of the present application, the at least two images of different quality may be obtained in various manners in the step S110.

Specifically, the at least two images of different resolutions and dynamic ranges are obtained by means of at least three exposures for different durations of one image sensor and pixel binning. For example, by using "pixel pair" arrangement adopted by FUJIFILM SUPER CCD EXR (not limited to this), a first image of a high resolution is obtained by means of one full-pixel exposure; and then two images that respectively record details of bright and dark areas are obtained by means of double exposure control, that is, by exposing two groups of pixels in a same CCD by using different exposures respectively, and then the two images are combined into one image by image processing to obtain a second image of a low resolution and a high dynamic range.

Alternatively, the at least two images of different resolutions and signal-to-noise ratios are obtained by means of one exposure of at least two image sensors. Taking obtaining two images as an example, two image sensors may be used, where the two sensors have different resolutions and work in a low-quality mode (low signal-to-noise ratio and/or low dynamic range) and a high-quality mode (high signal-to-noise ratio and/or high dynamic range) respectively, and the two image sensors are exposed at a same target scene to obtain two images of different resolutions and signal-to-noise ratios. In order to avoid an alignment problem of the two images caused by movement of a camera or a target between two exposures, a light-dividing apparatus (for example, a prism) may be used to divide incident light into two paths, and the required two images are obtained by exposing the two sensors under a same exposure condition. For more than two images, the images are obtained in a similar way.

Alternatively, the at least two images of different resolutions and dynamic ranges are obtained by means of one exposure of one image sensor and pixel binning. Still taking two images as an example, an image sensor is exposed once, and a cumulative amount of electricity of the image sensor is read twice, where, in one of the reading operations, an amount of electricity of each pixel is read, and finally a full-resolution first image of a low signal-to-noise ratio is obtained; and in the other reading operation, a pixel group (including N pixels, where N is not lower than 2) is taken as a unit, an amount of electricity of each pixel group is read, and a second image of a resolution being 1/N of the full resolution and a high signal-to-noise ratio is obtained.

Figure 2A:
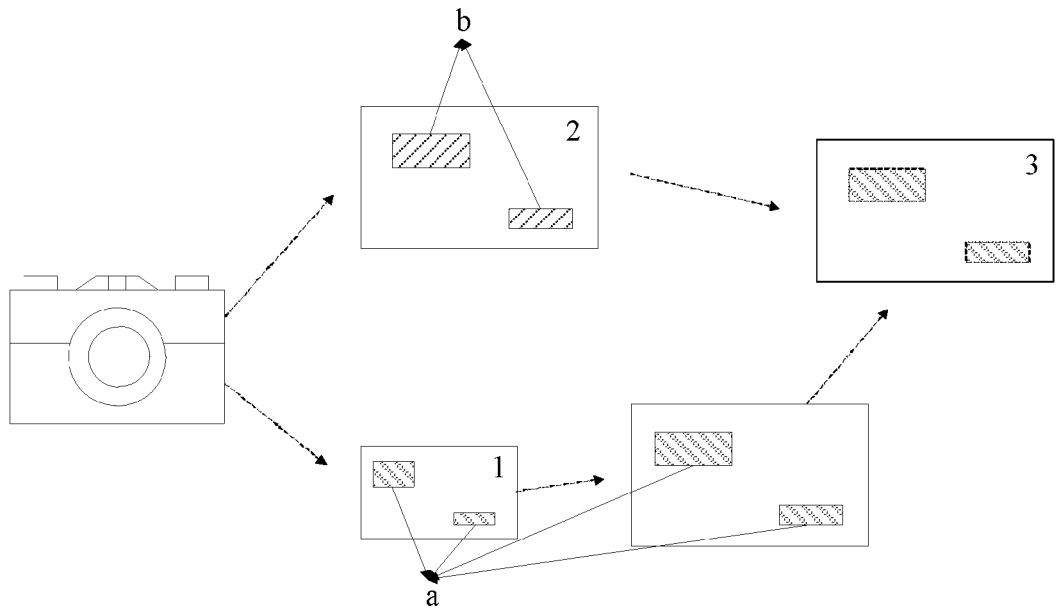
FIG. 2(a) and FIG. 2(b) are example schematic diagrams illustrating the principle of an image acquisition method according to an embodiment of the present application.

In addition, as shown in FIG. 2(a), in the step S120 of the method of this embodiment of the present application, the following replacement may be performed:

using a partial region a of a first image 1 of a first resolution R1 and a first dynamic range D1 in the at least two images to replace a corresponding region b of a second image 2 of a second resolution R2 and a second dynamic range D2 in the at least two images, to obtain a target image 3. The first resolution R1 is lower than the second resolution R2, and the first dynamic range D1 is greater than the second dynamic range D2.

In this case, the step S120 further comprises:

S121. Analyze a histogram of the first image 1 region by region.

A histogram is a way to show the precision of image exposure by using graphical parameters, and describes a grayscale distribution curve of an image within an image display range. The horizontal axis of the histogram may represent the number of pixels from black (dark area) to white (bright area) of an image, for example, a Level value at the darkest point is 0, and a Level value at the brightest point is 225. The vertical axis of the histogram represents the number of pixels at given Level values.

S122. Determine the partial region according to the histogram.

According to the histogram generated in the step S121, it can be determined whether an analyzed region needs to maintain a high dynamic range. For example, a threshold number of pixels may be preset for determining whether a high dynamic range needs to be maintained. If the number of pixels at given Level values (for example, comprising dark areas and bright areas) exceeds the threshold, it is determined that the current region is a region that needs to maintain a high dynamic range. For another example, an information entropy threshold may be preset for determining whether a high dynamic range needs to be maintained. If an information entropy of a region is higher than the information entropy threshold, it is determined that the current region is a region that needs to maintain a high dynamic range. The threshold number of pixels and the information entropy threshold may be set according to relevant experience of the target scene. After regions that need to maintain a high dynamic range are determined, a set of these regions constitutes the partial region a.

S123. Determine a corresponding region b in the second image 2 and use the partial region a to replace the corresponding region b.

After the partial region a in the first image 1 that needs to maintain a high dynamic range is determined, a corresponding region b in the second image 2 needs to be determined, so as to replace the corresponding region b. Because the resolution R2 of the second image 2 is higher than the resolution R1 of the first image 1, processing such as upsampling and low-pass filtering may be performed on the first image 1 according to R2, so that the first image 1 after being processed has the same resolution as that of the second image 2, and then the corresponding region b of the second image 2 is determined.

When more than two images are obtained, the foregoing process may be performed on every two images.

Figure 2B:
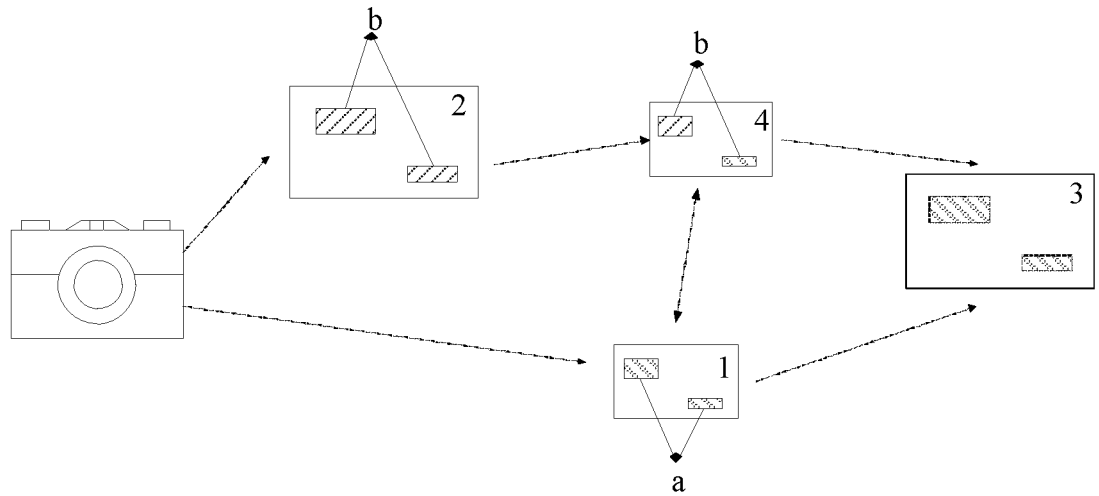

In addition, as shown in FIG. 2(b), in the step S120 of the method of this embodiment of the present application, the following replacement may be performed:

using a partial region a of a first image 1 of a first resolution R1 and a first signal-to-noise ratio S/N1 in the at least two images to replace a corresponding region b of a second image 2 of a second resolution R2 and a second signal-to-noise ratio S/N2 in the at least two images, to obtain a target image 3. The first resolution R1 is lower than the second resolution R2, and the first signal-to-noise ratio S/N1 is greater than the second signal-to-noise ratio S/N2. In this case, the step S120 may preferably further comprise (not limited to this):

S124. Perform downsampling processing on the second image 2 region by region according to the first resolution R1. A third image 4 having the same resolution as that of the first image 1 is obtained.

S125. Calculate, according to the third image 4 obtained by the downsampling processing and the first image 1, a mean square error (MSE) of noise signals region by region.

S126. Determine the partial region a according to the mean square error.

For example, a voltage value of the first image 1 is subtracted from voltage values of corresponding pixels of the third image 4 to approximately obtain noise signals, and then a mean square error of the noise signals of the region is calculated to obtain a noise variance of the region. If the noise variance is higher than a noise threshold, it is determined that the region is a region that needs to maintain a high signal-to-noise ratio, where the noise threshold may be set in the following manner:

Assuming that t1 is a numerical statistic (a median value, a mean value, or the like) of the mean square errors of all regions and t2 is an empirical value set of the system and related to the target scene, the noise threshold may be set as: $n=t1*u+t2*(1-u)$, where u is a parameter for adjusting combination weights of t1 and t2, has a value range of [0 to 1], and is set according to different images to be processed. For example, in a surveillance camera, because the image scene processed is relatively fixed, u may take a relatively large value.

The above description is only an exemplary method for finding a region that needs to maintain a high signal-to-noise ratio, and it can be understood by a person skilled in the art that the partial region may also be found by using other signal-to-noise ratio calculation methods. For example, the signal-to-noise ratio of the image may be estimated approximately as the ratio of a signal variance to a noise variance. First, local variances of all pixels in the region are calculated, where the maximum local variance is regarded as the signal variance and the minimum local variance is regarded as the noise variance; and the ratio of the signal variance to the noise variance is calculated, then converted to a dB number, and finally modified by an empirical formula.

S127. Determine a corresponding region b in the second image 2 and use the partial region a to replace the corresponding region b.

Similarly, when more than two images are obtained, the foregoing process may be performed on every two images. The foregoing determination of regions may also be performed for an image of a same target scene based on the resolution and dynamic range.

It should be noted that, as the target scene varies, there may be a special case: the determined region that needs a high dynamic range and/or a high signal-to-noise ratio may include a part having abundant semantic information, such as a human face, a sign or a license plate, and such contents should be displayed in enough detail, that is, regions corresponding to such contents should maintain a high resolution and tolerate a relatively low signal-to-noise ratio and/or dynamic range; therefore, such a region whose semantic information exceeds a preset threshold should not be comprised in the determined partial region and/or the corresponding region, in order that the image acquired by using the method of this embodiment of the present application can maintain relatively abundant semantic information.

Correspondingly, the step S120 of the method of this embodiment of the present application further comprises:

S128. Detect semantic information of the first image and/or the second image. Semantic information detection is a mature technology in the art, which is not described herein again.

In the process of using the partial region to replace the corresponding region, in order to prevent the boundary of the replaced region from having a clear dividing line which affects viewing effects, the replacement may be performed pixel by pixel in the process of using the partial region to replace the corresponding region, so as to avoid formation of a region boundary visible to naked eyes. Alternatively, in the process of using the partial region to replace the corresponding region, the replacement is performed by using alpha-blending, so that the boundary after the replacement changes gradually.

Moreover, in order to prevent the region boundary from causing blocky artifacts, the term "region" in various region-by-region processing on images used in this embodiment of the present application may be of an irregular shape, and the whole image is divided by using a jigsaw puzzle method.

In conclusion, in the method of this embodiment of the present application, local combination is performed on at least two images of different image quality according to data characteristics of the images, so that the dynamic range and/or signal-to-noise ratio can be improved locally on the basis of presenting image details as fully as possible, that is, the image quality can be improved according to requirements. In addition, a region having abundant semantic information is adequately retained during local combination, and the region boundary after the combination is smooth, which avoids a region boundary visible to naked eyes, thereby achieving good user experience.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

Figure 3:
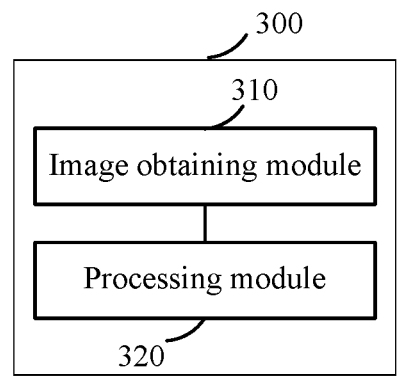
FIG. 3 is an example structural block diagram of an image acquisition apparatus according to an embodiment of the present application.

An embodiment of the present application further provides an image acquisition apparatus. The apparatus may be a digital camera or any other device that has an image acquisition function, such as a mobile phone, a portable computer or a wearable device. The apparatus may entirely or partly be a part of the foregoing device, or be an apparatus independent of the foregoing device. As shown in FIG. 3, an image acquisition apparatus 300 provided by an embodiment of the present application comprises: an image obtaining module 310, and a processing module 320.

The image obtaining module 310 is configured to obtain at least two images of different image quality of a target scene.

In the apparatus of this embodiment of the present application, the different image quality comprises possibilities of: different resolutions and dynamic ranges; different resolutions and signal-to-noise ratios; and different resolutions, dynamic ranges and signal-to-noise ratios. The image obtaining module 3 can obtain the at least two images of different image quality according to different exposure strategies (different durations and numbers of times) and pixel binning technologies. Pixel binning refers to combining information of a group of pixels (for example, two, four or more pixels) into one pixel, so as to reduce picture noise and improve the photosensitivity, and such pixel binning reduces the resolution of the image at the same time.

The processing module 320 is configured to combine, according to data characteristics of the at least two images, the at least two images locally to obtain a target image.

The data characteristics of an image may refer to features that represent digital image characteristics, such as grayscale distribution, amount of noise and amount of information of the image. Regions that need a relatively high dynamic range, regions that have a relatively high amount of noise, details that need to be presented, and the like of a target scene can be determined according to the data characteristics of the image. Preferably, in the apparatus of this embodiment of the present application, the processing module 320 performs local pixel binning on the basis of maintaining a relatively large resolution according to the data characteristics of the image, so as to obtain a relatively high dynamic range and/or a relatively high signal-to-noise ratio of the image locally.

In conclusion, in the apparatus of this embodiment of the present application, local combination is performed on at least two images of different image quality of a target scene according to data characteristics of the images, so that the dynamic range and/or signal-to-noise ratio can be improved locally on the basis of presenting image details as fully as possible, that is, the image quality can be improved according to requirements.

In the apparatus of this embodiment of the present application, the image obtaining module 310 may obtain the at least two images of different quality in various manners.

Specifically, the at least two images of different resolutions and dynamic ranges are obtained by means of at least three exposures for different durations of one image sensor and pixel binning. For example, by using "pixel pair" arrangement adopted by FUJIFILM SUPER CCD EXR (not limited to this), a first image of a high resolution is obtained by means of one full-pixel exposure; and then two images that respectively record details of bright and dark areas are obtained by means of double exposure control, that is, by exposing two groups of pixels in a same CCD by using different exposures respectively, and then the two images are combined into one image by image processing to obtain a second image of a low resolution and a high dynamic range.

Alternatively, the at least two images of different resolutions and signal-to-noise ratios are obtained by means of one exposure of at least two image sensors. Taking obtaining two images as an example, two image sensors may be used, where the two sensors have different resolutions and work in a low-quality mode (low signal-to-noise ratio and/or low dynamic range) and a high-quality mode (high signal-to-noise ratio and/or high dynamic range) respectively, and the two image sensors are exposed at a same target scene to obtain two images of different resolutions and signal-to-noise ratios. In order to avoid an alignment problem of the two images caused by movement of a camera or a target between two exposures, a light-dividing apparatus (for example, a prism) may be used to divide incident light into two paths, and the required two images are obtained by exposing the two sensors under a same exposure condition. For more than two images, the images are obtained in a similar way.

Alternatively, the at least two images of different resolutions and dynamic ranges are obtained by means of one exposure of one image sensor and pixel binning. Still taking two images as an example, an image sensor is exposed once, and a cumulative amount of electricity of the image sensor is read twice, where, in one of the reading operations, an amount of electricity of each pixel is read, and finally a full-resolution first image of a low signal-to-noise ratio is obtained; and in the other reading operation, a pixel group (including N pixels, where N is not lower than 2) is taken as a unit, an amount of electricity of each pixel group is read, and a second image of a resolution being 1/N times of the full resolution and a high signal-to-noise ratio is obtained.

Figure 4:
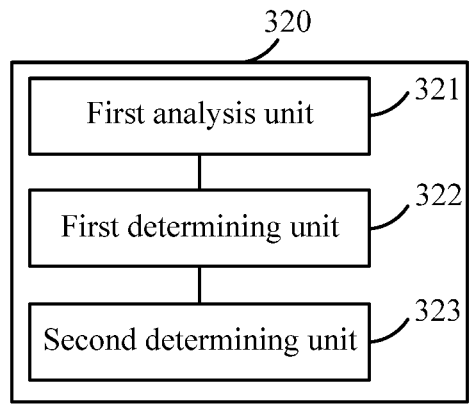
FIG. 4 is a first example structural block diagram of a processing module in an image acquisition apparatus according to an embodiment of the present application.

In addition, as shown in FIG. 2(a), the processing module 320 of the apparatus of this embodiment of the present application may perform the following replacement:

using a partial region a of a first image 1 of a first resolution R1 and a first dynamic range D1 in the at least two images to replace a corresponding region b of a second image 2 of a second resolution R2 and a second dynamic range D2 in the at least two images, to obtain a target image 3. The first resolution R1 is lower than the second resolution R2, and the first dynamic range D1 is greater than the second dynamic range D2. In this case, as shown in FIG. 4, the processing module 320 further comprises: a first analysis unit 321, a first determining unit 322, and a second determining unit 323.

The first analysis unit 321 is configured to analyze a histogram of the first image 1 region by region.

A histogram is a way to show the precision of image exposure by using graphical parameters, and describes a grayscale distribution curve of an image within an image display range. The horizontal axis of the histogram may represent the number of pixels from black (dark area) to white (bright area) of an image, for example, a Level value at the darkest point is 0, and a Level value at the brightest point is 225. The vertical axis of the histogram represents the number of pixels at given Level values.

The first determining unit 322 is configured to determine the partial region according to the histogram.

According to the histogram generated by the first analysis unit 321, it can be determined whether an analyzed region needs to maintain a high dynamic range. For example, a threshold number of pixels may be preset for determining whether a high dynamic range needs to be maintained. If the number of pixels at given Level values (for example, comprising dark areas and bright areas) exceeds the threshold, it is determined that the current region is a region that needs to maintain a high dynamic range. For another example, an information entropy threshold may be preset for determining whether a high dynamic range needs to be maintained. If an information entropy of a region is higher than the information entropy threshold, it is determined that the current region is a region that needs to maintain a high dynamic range. The threshold number of pixels and the information entropy threshold may be set according to relevant experience of the target scene. After regions that need to maintain a high dynamic range are determined, a set of these regions constitutes the partial region a.

The second determining unit 323 is configured to determine a corresponding region b in the second image 2 and use the partial region a to replace the corresponding region b.

After the partial region a in the first image 1 that needs to maintain a high dynamic range is determined, a corresponding region b in the second image 2 needs to be determined, so as to replace the corresponding region b. Because the resolution R2 of the second image 2 is higher than the resolution R1 of the first image 1, processing such as upsampling and low-pass filtering may be performed on the first image 1 according to R2, so that the first image 1 after being processed has the same resolution as that of the second image 2, and then the corresponding region b of the second image 2 is determined.

When more than two images are obtained, the foregoing process may be performed on every two images.

Figure 5:
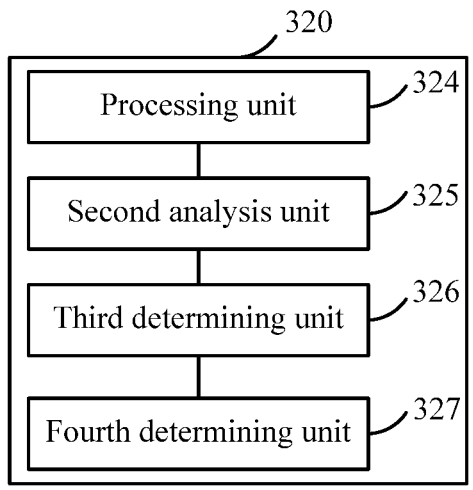
FIG. 5 is a second example structural block diagram of a processing module in an image acquisition apparatus according to an embodiment of the present application.

In addition, as shown in FIG. 2(b), the processing module 320 of the apparatus of this embodiment of the present application may further perform the following replacement:

using a partial region a of a first image 1 of a first resolution R1 and a first signal-to-noise ratio S/N1 in the at least two images to replace a corresponding region b of a second image 2 of a second resolution R2 and a second signal-to-noise ratio S/N2 in the at least two images, to obtain a target image 3. The first resolution R1 is lower than the second resolution R2, and the first signal-to-noise ratio S/N1 is greater than the second signal-to-noise ratio S/N2. In this case, as shown in FIG. 5, the processing module 320 further comprises: a processing unit 324, a second analysis unit 325, a third determining unit 326, and a fourth determining unit 327.

The processing unit 324 is configured to perform downsampling processing on the second image 2 region by region according to the first resolution R1. A third image 4 having the same resolution as that of the first image 1 is obtained.

The second analysis unit 325 is configured to calculate, according to the third image 4 obtained by the downsampling processing and the first image 1, a mean square error of noise signals region by region.

The third determining unit 326 is configured to determine the partial region a according to the mean square error.

For example, a voltage value of the first image 1 is subtracted from voltage values of corresponding pixels of the third image 4 to approximately obtain noise signals, and then a mean square error of the noise signals of the region is calculated to obtain a noise variance of the region. If the noise variance is higher than a noise threshold, it is determined that the region is a region that needs to maintain a high signal-to-noise ratio, where the noise threshold may be set in the following manner:

Assuming that t1 is a numerical statistic (a median value, a mean value, or the like) of the mean square errors of all regions and t2 is an empirical value set of the system and related to the target scene, the noise threshold may be set as: $n=t1*u+t2*(1-u)$, where u is a parameter for adjusting combination weights of t1 and t2, has a value range of [0 to 1], and is set according to different images to be processed. For example, in a surveillance camera, because the image scene processed is relatively fixed, u may take a relatively large value.

The above description is only an exemplary method for finding a region that needs to maintain a high signal-to-noise ratio, and it can be understood by a person skilled in the art that the partial region may also be found by using other signal-to-noise ratio calculation methods. For example, the signal-to-noise ratio of the image may be estimated approximately as the ratio of a signal variance to a noise variance. First, local variances of all pixels in the region are calculated, where the maximum local variance is regarded as the signal variance and the minimum local variance is regarded as the noise variance; and the ratio of the signal variance to the noise variance is calculated, then converted to a dB number, and finally modified by an empirical formula.

The fourth determining unit 327 is configured to determine a corresponding region b in the second image 2 and use the partial region a to replace the corresponding region b.

Similarly, when more than two images are obtained, the foregoing process may be performed on every two images. The foregoing determination of regions may also be performed for an image of a same target scene based on the resolution and dynamic range.

It should be noted that, as the target scene varies, there may be a special case: the determined region that needs a high dynamic range and/or a high signal-to-noise ratio may include a part having abundant semantic information, such as a human face, a sign or a license plate, and such contents should be displayed in enough detail, that is, regions corresponding to such contents should maintain a high resolution and can tolerate a relatively low signal-to-noise ratio and/or dynamic range; therefore, such a region whose semantic information exceeds a preset threshold should not be comprised in the determined partial region and/or the corresponding region, in order that the image acquired by using the apparatus of this embodiment of the present application can maintain relatively abundant semantic information.

Figure 6A:
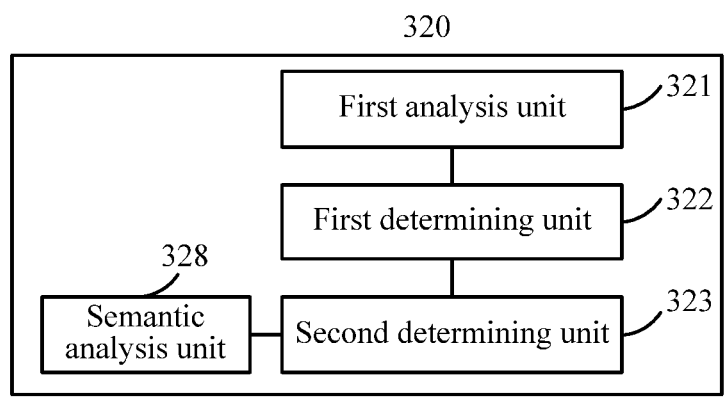
FIG. 6(a) is a third example structural block diagram of a processing module in an image acquisition apparatus according to an embodiment of the present application.
Figure 6B:
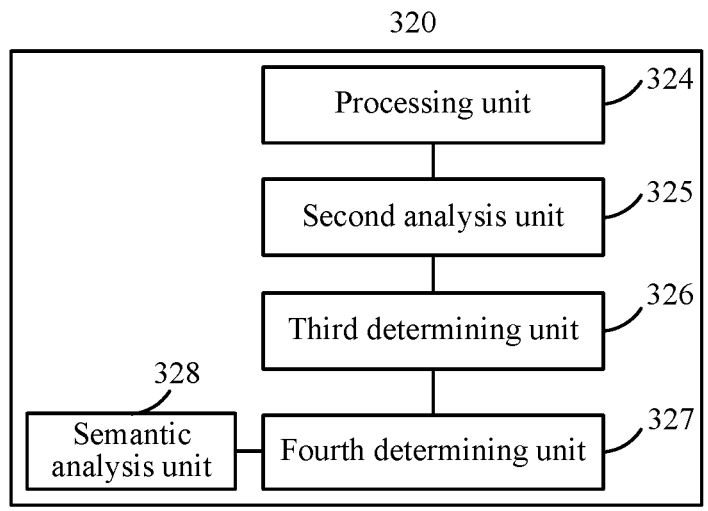
FIG. 6(b) is a fourth example structural block diagram of a processing module in an image acquisition apparatus according to an embodiment of the present application.

Correspondingly, as shown in FIG. 6(a) and FIG. 6(b), the processing module 320 of the apparatus of this embodiment of the present application not only comprises the units shown in FIG. 4 and FIG. 5, but also further comprises:

a semantic analysis unit 328, configured to detect semantic information of the first image and/or the second image. Semantic information detection is a mature technology in the art, which is not described herein again.

In the process of using the partial region to replace the corresponding region, in order to prevent the boundary of the replaced region from having a clear dividing line which affects viewing effects, the replacement may be performed pixel by pixel in the process of using the partial region to replace the corresponding region, so as to avoid formation of a region boundary visible to naked eyes. Alternatively, in the process of using the partial region to replace the corresponding region, the replacement is performed by using alpha-blending, so that the boundary after the replacement changes gradually.

Moreover, in order to prevent the region boundary from causing blocky artifacts, the term "region" in various region-by-region processing on images used in this embodiment of the present application may be of an irregular shape, and the whole image is divided by using a jigsaw puzzle method.

In conclusion, in the apparatus of this embodiment of the present application, local combination is performed on at least two images of different image quality according to data characteristics of the images, so that the dynamic range and/or signal-to-noise ratio can be improved locally on the basis of presenting image details as fully as possible, that is, the image quality can be improved according to requirements. In addition, a region having abundant semantic information is adequately retained during local combination, and the region boundary after the combination is smooth, which avoids a region boundary visible to naked eyes, thereby achieving good user experience.

Figure 7:
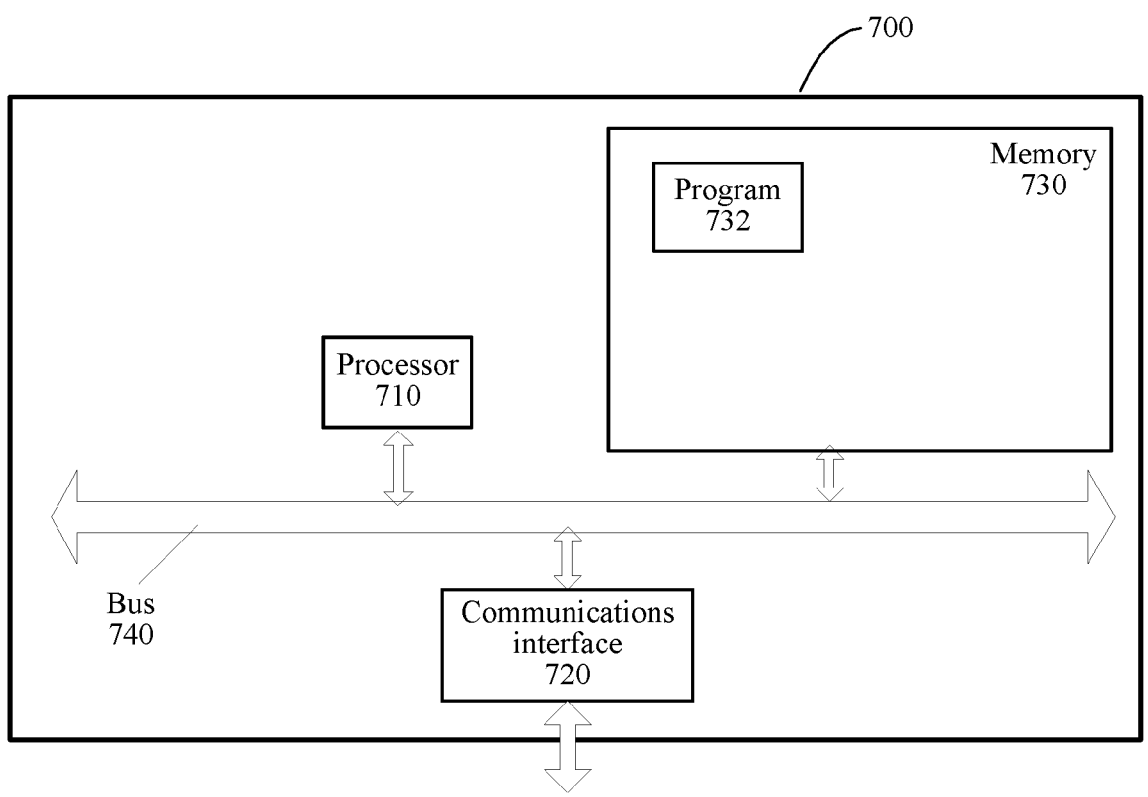
FIG. 7 is another example structural block diagram of an image acquisition apparatus according to an embodiment of the present application.

FIG. 7 is a schematic structural diagram of another image acquisition apparatus 700 according to an embodiment of the present application. Example embodiments of the present application are not intended to limit the specific implementation of the image acquisition apparatus 700. As shown in FIG. 7, the image acquisition apparatus 700 may comprise:

a processor 710, a communications interface 720, a memory 730, and a communications bus 740.

The processor 710, the communications interface 720, and the memory 730 communicate with each other by using the communications bus 740.

The communications interface 720 is configured to communicate with a network element such as a client.

The processor 710 is configured to execute a program 732, and specifically can implement relevant functions of the foregoing image acquisition apparatuses in the apparatus embodiments shown in FIG. 3 to FIG. 6.

Specifically, the program 732 may comprise program code, where the program code comprises a computer operation instruction.

The processor 710 may be a central processing unit (CPU), or an application specific integrated circuit (ASIC), or may be configured as one or more integrated circuits that implement the embodiments of the present application.

The memory 730 is configured to store the program 732. The memory 730 may comprise a high speed random access memory (RAM), and may also comprise a non-volatile memory such as at least one magnetic disk storage. The program 732 may specifically execute the following steps:

obtaining at least two images of different image quality of a target scene; and combining, according to data characteristics of the at least two images, the at least two images locally to obtain a target image.

Although the various embodiments are described herein in the general context of program modules that execute in conjunction with an application program that runs on an operating system on a computer system, a person skilled in the art will recognize that the various embodiments may also be implemented in combination with other types of program modules. Generally, program modules comprise routines, programs, components, data structures and other types of structures that perform particular tasks or implement particular abstract data types. It can be understood by a person skilled in the art that the various embodiments described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing embodiments are only used to describe the present application, but not to limit the present application. A person of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. A method, comprising:
   obtaining, by a device comprising a processor, at least two images of different image quality of a target scene; and
   combining, according to data characteristics of the at least two images, the at least two images locally to obtain a target image, wherein the combining, according to the data characteristics of the at least two images, the at least two images locally to obtain the target image comprises:
     using a first partial region of a first image of a first resolution and a first dynamic range in the at least two images to replace a first corresponding region of a second image of a second resolution and a second dynamic range in the at least two images, to obtain the target image, wherein the first resolution is lower than the second resolution, and wherein the first dynamic range is greater than the second dynamic range, or
     using a second partial region of the first image of the first resolution and a first signal-to-noise ratio in the at least two images to replace a second corresponding region of the second image of the second resolution and a second signal-to-noise ratio in the at least two images, to obtain the target image, wherein the first resolution is lower than the second resolution, and wherein the first signal-to-noise ratio is greater than the second signal-to-noise ratio.

2. The method of claim 1, wherein the at least two images of different image quality are images of different resolutions and of different dynamic ranges or signal-to-noise ratios.

3. The method of claim 1, wherein the obtaining the at least two images of different image quality of the target scene comprises:
   obtaining, using at least three exposures for different durations of one image sensor and pixel binning, the at least two images of different resolutions and dynamic ranges.

4. The method of claim 1, wherein the obtaining the at least two images of different image quality of the target scene comprises:
   obtaining, using one exposure of at least two image sensors, the at least two images of different resolutions and signal-to-noise ratios.

5. The method of claim 1, wherein the obtaining the at least two images of different image quality of the target scene comprises:
   obtaining, using one exposure of one image sensor and pixel binning, the at least two images of different resolutions and dynamic ranges.

6. The method of claim 1, wherein the using the first partial region of the first image of the first resolution and the first dynamic range in the at least two images to replace the first corresponding region of the second image of the second resolution and the second dynamic range in the at least two images, to obtain the target image comprises:
   analyzing a histogram of the first image region by region;
   determining the first partial region according to a result of the analyzing the histogram; and
   determining the first corresponding region in the second image and using the first partial region to replace the first corresponding region.

7. The method of claim 1, wherein the using the second partial region of the first image of the first resolution and the first signal-to-noise ratio in the at least two images to replace the second corresponding region of the second image of the second resolution and the second signal-to-noise ratio in the at least two images, to obtain the target image comprises:
   performing downsampling processing on the second image region by region;
   determining, according to another image obtained by the downsampling processing and the first image, a mean square error of noise signals region by region;
   determining the second partial region according to the mean square error; and
   determining the second corresponding region in the second image and using the second partial region to replace the second corresponding region.

8. The method of claims 1, wherein the first partial region or the first corresponding region, or the second partial region or the second corresponding region does not comprise a region with semantic information that exceeds a preset threshold.

9. The method of claim 8, wherein the combining, according to the data characteristics of the at least two images, the at least two images locally to obtain the target image further comprises:
   detecting semantic information of the first image or the second image of the at least two images.

10. The method of claim 1, wherein in the process of the using the first partial region to replace the first corresponding region or in the process of the using the second partial region to replace the second corresponding region, the replacement is performed pixel by pixel.

11. The method of claim 1, wherein, in the process of the using the first partial region to replace the first corresponding region or in the process of the using the second partial region to replace the second corresponding region, the replacement is performed by using alpha-blending.

12. The method of claim 1, wherein the first partial region or the second partial region is of an irregular shape.

13. An apparatus, comprising:
   a processor, coupled to a memory, that executes or facilitates execution of executable modules, comprising:
     an image obtaining module configured to obtain at least two images of different image qualities of a target scene; and
     a processing module configured to combine, according to data characteristics of the at least two images, the at least two images locally, to obtain a target image, wherein:
     the processing module uses a first partial region of a first image of the at least two images to replace a corresponding first region of a second image of the at least two images to obtain the target image, wherein the first image is of a first resolution and is of a first dynamic range, wherein the second image is of a second resolution and is of a second dynamic range, wherein the first resolution is lower than the second resolution, and wherein the first dynamic range is greater than the second dynamic range, or the processing module uses a second partial region of the first image of the at least two images to replace a corresponding second region of the second image of the at least two images, to obtain the target image, wherein the first image is of the first resolution and of a first signal-to-noise ratio, wherein the second image is of the second resolution and is of a second signal-to-noise ratio, wherein the first resolution is lower than the second resolution, and wherein the first signal-to-noise ratio is greater than the second signal-to-noise ratio.

14. The apparatus of claim 13, wherein the image obtaining module obtains, via processing at least three exposures, the at least two images having different resolutions and different dynamic ranges, and wherein the three exposures are respectively captured for different durations of one image sensor via pixel binning.

15. The apparatus of claim 13, wherein the image obtaining module obtains the at least two images having different resolutions and different signal-to-noise ratios via processing of one exposure of at least two image sensors.

16. The apparatus of claim 13, wherein the image obtaining module obtains the at least two images having different resolutions and different dynamic ranges via processing of one exposure of one image sensor via pixel binning.

17. The apparatus of claim 13, wherein the processing module comprises:
a first analysis unit configured to analyze a histogram of the first image region by region;
a first determining unit configured to determine the first partial region according to the histogram; and
a second determining unit configured to determine the corresponding first region in the second image of the at least two images and use the first partial region to replace the corresponding first region.

18. The apparatus of claim 13, wherein the processing module comprises:
a processing unit configured to perform downsampling processing on the first image region by region;
a second analysis unit configured to calculate, according to a third image obtained by the downsampling processing and the first image, a mean square error of noise signals region by region;
a third determining unit configured to determine the first partial region according to the mean square error; and
a fourth determining unit configured to determine the corresponding first region in the second image and use the first partial region to replace the corresponding first region.

19. The apparatus of claim 13, wherein the processing module further comprises:
a semantic analysis unit configured to detect semantic information of the first image or of the second image of the at least two images.

20. The apparatus of claim 13, wherein the processing module replaces the corresponding first region or the corresponding second region of the second image pixel by pixel in the process of using the first partial region or the second partial region to replace the corresponding first region or the corresponding second region, respectively.

21. The apparatus of claim 13, wherein the processing module replaces the corresponding first region or the corresponding second region of the second image by using alpha-blending in the process of using the first partial region or the second partial region to replace the corresponding first region or the corresponding second region, respectively.

22. A non-transitory computer readable storage medium, comprising at least one executable instruction, which, in response to execution, causes a system comprising a processor to perform operations, comprising:
receiving at least two images of different image quality of a target scene; and
combining, according to data characteristics of the at least two images, the at least two images locally to obtain a target image, wherein the combining, according to the data characteristics of the at least two images, the at least two images locally to obtain the target image comprises:
using a first partial region of a first image of the at least two images, at a first resolution and having a first dynamic range, to replace a corresponding first region of a second image of the at least two images, at a second resolution and having a second dynamic range, to obtain the target image, wherein the first resolution is lower than the second resolution, and wherein the first dynamic range is greater than the second dynamic range; or
using a second partial region of the first image at the first resolution and having a first signal-to-noise ratio to replace a corresponding second region of the second image at the second resolution and having a second signal-to-noise ratio, to obtain the target image, wherein the first resolution is lower than the second resolution, and wherein the first signal-to-noise ratio is greater than the second signal-to-noise ratio.

23. The non-transitory computer readable storage medium of claim 22, wherein the receiving the at least two images of different image quality of the target scene comprises:
receiving the first image comprising a pixel determined from pixel binning corresponding pixels of at least three exposures for different durations of one image sensor.

24. The non-transitory computer readable storage medium of claim 22, wherein the receiving the at least two images of different image quality of the target scene comprises:
receiving the first image comprising image data determined from an exposure of at least two image sensors.

25. A device for image acquisition, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:
receiving at least two images of different image quality of a target scene; and
combining, according to data characteristics of the at least two images, the at least two images locally to obtain a target image, wherein the combining, according to the data characteristics of the at least two images, the at least two images locally to obtain the target image comprises:
using a first partial region of a first image of the at least two images, at a first resolution and having a first dynamic range, to replace a corresponding first region of a second image of the at least two images, at a second resolution and having a second dynamic range, to obtain the target image, wherein the first resolution is lower than the second resolution, and wherein the first dynamic range is greater than the second dynamic range; or using a second partial region of the first image, at the first resolution and having a first signal-to-noise ratio, to replace a corresponding second region of the second image, at the second resolution and having a second signal-to-noise ratio, to obtain the target image, wherein the first resolution is lower than the second resolution, and wherein the first signal-to-noise ratio is greater than the second signal-to-noise ratio.

26. The device of claim 25, wherein the receiving the at least two images of different image quality of the target scene comprises:

receiving the first image comprising a pixel determined from pixel binning corresponding pixels of at least three exposures for different durations of one image sensor.

27. The device of claim 25, wherein the receiving the at least two images of different image quality of the target scene comprises:

receiving the first image comprising image data determined from an exposure of at least two image sensors.

* * * * *